United States Patent [19]

Thompson

[11] E Re. 31,561

[45] Reissued Apr. 24, 1984

[54] LARGE CAPACITY DRAINAGE RECEPTACLE

[76] Inventor: C. Ames Thompson, 3024 W. Weldon Ave., Phoenix, Ariz. 85017

[21] Appl. No.: 397,012

[22] Filed: Jul. 12, 1982

Related U.S. Patent Documents

Reissue of:

[64] Patent No.: 4,321,713
Issued: Mar. 30, 1982
Appl. No.: 207,400
Filed: Nov. 17, 1980

U.S. Applications:

[63] Continuation-in-part of Ser. No. 93,310, Nov. 13, 1979, abandoned.

[51] Int. Cl.[3] ..... E03C 1/26

[52] U.S. Cl. ..... 4/290; 4/286; 4/291; 4/292

[58] Field of Search ..... 4/286, 290, 291, 292, 4/289, 191; 285/56, 57, 58, 59

[56] References Cited

U.S. PATENT DOCUMENTS

| | | | |
|---|---|---|---|
| 412,495 | 10/1889 | Marker | 4/288 |
| 998,404 | 7/1911 | Schaffer | 4/289 |
| 1,918,509 | 7/1933 | Wilcox | 4/286 X |
| 2,191,686 | 2/1940 | Shenk | 4/289 |
| 2,505,305 | 4/1950 | Schaefer | 4/289 |
| 2,705,542 | 4/1955 | Yavitch | 4/288 X |
| 2,749,999 | 6/1956 | Schmid | 4/288 UX |
| 2,859,452 | 11/1958 | Seewack | 4/288 |
| 3,007,179 | 11/1961 | Bartulli | 4/287 |
| 3,420,552 | 1/1969 | Mork | 4/288 X |
| 3,742,524 | 7/1973 | Ballentine | 4/292 |

FOREIGN PATENT DOCUMENTS

| | | | |
|---|---|---|---|
| 1413819 | 11/1964 | France | 4/191 |
| 135767 | 12/1919 | United Kingdom | 4/191 |

*Primary Examiner*—Henry K. Artis
*Attorney, Agent, or Firm*—Herbert E. Haynes, Jr.

[57] ABSTRACT

A large capacity drainage receptacle for flush mounting in a surface to be drained including an especially configured mounting flange from which a receptacle body integrally depends. The drainage receptacle is formed of light weight thin-wall stainless steel and is configured to demountably support a strainer basket therein for catching and retaining solid foreign materials and for demountably supporting a flush mounted perforated cover plate thereon for supporting traffic passing over the drainage receptacle.

19 Claims, 3 Drawing Figures

LARGE CAPACITY DRAINAGE RECEPTACLE

Matter enclosed in heavy brackets [ ] appears in the original patent but forms no part of this reissue specification; matter printed in italics indicates the additions made by reissue.

CROSS-REFERENCE TO RELATED APPLICATION

This application is a continuation-in-part of copending U.S. Patent application Ser. No. 93,310, filed Nov. 13, 1979, for FLUSH-MOUNTED DRAINAGE RECEPTACLE, by the same inventor now abandoned.

BACKGROUND OF THE INVENTION

1. Field of the Invention

This invention relates to drainage mechanisms and more particularly to a large capacity drainage receptacle for flush mounting in a surface to be drained for retaining solid waste material while permitting liquids to flow through the receptacle into a liquid disposal line.

2. Description of the Prior Art

Large capacity drainage receptacles utilized to drain the surface in which they are mounted are in common usage, and when such receptacles are used in floors of food preparing rooms such as restaurant kitchens and the like, they are commonly called floor sinks. These same large capacity drainage receptacles are also commonly used for draining flat roofs, and when so used are referred to as roof drains.

For many years, these large capacity drainage receptacles, i.e. floor sinks and roof drains, have been heavy cast iron structures which are often porcelainized. Due to the costs of casting, porcelainizing, shipping and otherwise handling these heavy prior art large capacity drainage receptacles, the recent trend is to fabricate them of stainless steel. This trend results in considerable savings in shipping and handling, however, the fabrication costs for forming, welding, finishing, etc. of these stainless steel prior art structures, is relatively high.

Of particular concern in large capacity drainage receptacles are the solid wastes which are carried by water into the receptacle. The possibility that such solid waste will block the receptacle and prevent drainage, or even worse, will pass through the receptacle and block the sewer lines, has led to several schemes utilizing strainer devices that are demountably positioned in the receptacle, with such strainers being designed to prevent blockage of the receptacle or sewer lines and permit liquid to be drained away.

A prior art strainer device commonly used in such large capacity drainage receptacles which performed this function reasonably well comprised a perforated hemispherical structure which was placed over the drain outlet at the bottom of the receptacle. Solid wastes could accumulate at the bottom of the receptacle unnoticed while the liquid continued to flow into the receptacle and out through the drainage outlet thereof. Eventually, however, the accumulated buildup of solid waste prevented the drainage of liquid from the receptacle and the receptacle would overflow onto the surface which it was supposed to be draining. When this happened, it was necessary for a person to plunge his hand and arm into the muck and liquid trapped in the receptacle. Much of the solid waste would have to be cleared by hand to permit the liquid to flow from the receptacle. The hemispherical strainer device was then removed for cleaning with the usual result that some of the solid waste material would escape down through the drainage outlet in the receptacle. To one who had to clear such blockages, this particular prior art strainer device was never considered adequate for the task it was designed to perform.

A significant improvement in strainer devices for use in large capacity drainage receptacles was disclosed by Thompson and Cooper in U.S. Pat. No. 3,713,539, which issued on Jan. 30, 1973. The invention taught therein provided a strainer basket mounted within a rigid frame which was supported high above the drainage outlet of the drainage receptacle. In either of two embodiments therein disclosed, the basket was easily accessible for emptying and cleaning without the necessity of emersing ones hands and arms in a receptacle filled with a surplus melange of solid waste and liquid.

This latter invention, however, had two minor drawbacks. Such surface mounted drainage receptacle are frequently utilized to draw off the output of relatively short lengths of drainage pipe or hose which are laid on the surface that is normally drained by the drainage receptacles. The liquid output from such drainage pipes is ducted into the input opening of the drainage receptacle. On occasions, flow from such drainage pipes is of sufficient volume to cause splashing when the liquid output strikes the rim of the drainage receptcle. Such splashing is inconvenient and can make the surface dangerous for casual passersby. A second disadvantage lies in the initial cost of fabricating and mounting the strainer device. In the particular embodiment of this prior invention in which the drainage receptacle is placed in an area of heavy foot traffic, a perforated plate was provided which mounted flush with the surface to be drained so as to provide little or no impediment to persons walking across the drainage surface. Means had to be provided below the surface of this perforated plate to suspendingly mount the strainer basket. The necessity of providing such support means increased the fabrication costs of this drainage receptacle. Further, this particular drainage receptacle included a receptacle body of substantially square cross sectional configuration, and such a structure is expensive to fabricate.

It is therefore, an object of the present invention to provide a large capacity drainage receptacle which can be fabricated and provided at reduced cost when compared with prior art devices.

It is a further object of this invention to provide means for supporting a strainer device within a drainage receptacle with such support means being structured in the drainage receptacle itself independent of the cover plate that is used when the drainage receptacle is employed in areas of heavy pedestrian traffic.

It is a more specific object of the present invention that said means for supporting said strainer device shall also function as an anti-splash medium acting to overcome the disadvantages found in the prior art.

A further specific objective of this invention is to provide a simple means for positioning and stabilizing a perforated plate in a flush-mounted relationship in the inlet opening of said drainage receptacle so as to provide easy passage in areas of heavy pedestrian traffic.

The foregoing and other objects of the present invention, as well as the invention itself, may be more fully understood from the following description when read in conjunction with the accompanying drawings.

SUMMARY OF THE INVENTION

In accordance with the present invention, a new and improved large capacity drainage receptacle is disclosed, with the receptacle being of the type commonly referred to as a floor sink or roof drain. The drainage receptacle is designed for flush mounting in a surface, such as the floor of a food preparation area or in a flat roof, to collect liquids from the surface and funnel them into comparatively smaller suitable liquid disposal lines such as sewer lines or roof drain pipes, and to collect solid materials carried by the liquid and thereby prevent their passage into the disposal lines.

The drainage receptacle is preferrably constructed of thin-walled stainless steel for weight considerations and the inherent resistance of that material to rusting and corrosion. The receptacle includes an especially configured mounting flange at its upper inlet end from which a special low cost receptacle body depends to form the outlet end of the drainage receptacle. The mounting flange is of square configuration and includes an upper flange, for flush mounting in the surface to be drained, and defines a square opening. An endless sidewall, or web, integrally depends normally from the upper flange and an endless recessed flange extends inwardly from the lower end of the sidewall and circumscribingly defines a circular opening. This recessed design of the drainage receptacle mounting flange provides the drainage receptacle with an anti-splash characteristic so that liquids directed into the receptacle from pipes or hoses lying on the surfaces to be drained will not splash onto the surface and cause a slippery or otherwise dangerous situation. The recessed design also provides means for demountably restingly supporting a strainer basket so that it is spaced well above the drainage outlet, by which the receptacle body is coupled to the disposal line, and is recessed with respect to the upper flange of the drainage receptacle. The strainer basket will catch and retain solid material and by virtue of its being mounted well above the drainage outlet of the receptacle body, emptying and cleaning thereof is facilitated, and such mounting allows the strainer basket to be considerably larger than the drainage outlet so that less frequent emptying and cleaning is required to keep the drainage receptacle from clogging.

Draining receptacles of the instant type are often used in areas of heavy pedestrian traffic, therefore, a perforated cover plate is provided which is configured to demountably restingly fit within the square opening defined by the upper flange and is positioned to be flush with that upper flange. To provide stability to the perforated cover plate, an endless wall depends from the lower surface of the cover plate and the lower edge of that endless wall restingly bears on the upper surface of the recessed flange to prevent tipping of the cover, and the endless wall is in bearing engagement, or at least close proximity, with the endless web of the mounting flange to prevent sliding of the cover. The perforated cover plate is also provided with rigidifying means in the form of an inverted U-shaped channel which depends from its bottom surface and extends across the middle of the cover plate to provide it with the ability to support considerable weight.

The above described configuration of the mounting flange of the drainage receptacle provides considerable cost advantages over the prior art in that a comparatively simple stamping operation, or functional equivalent, is employed and the mounting flange may be used regardless of whether or not the particular installation requires the use of a strainer basket and whether or not the use of the cover plate is needed.

The receptacle body is fixedly attached, such as by welding, so as to depend from the bottom surface of the recessed flange of the drainage receptacle mounting flange. The drainage receptacle body is circular in cross section which results in further cost savings due to the inherent simplicity of fabricating such a structure as compared to the relative complexity of fabricating it in a multi-sided configuration.

The combination of all these improvements provides a less expensive and more efficient drainage receptacle.

DESCRIPTION OF THE PREFERRED EMBODIMENT

Figure 1:
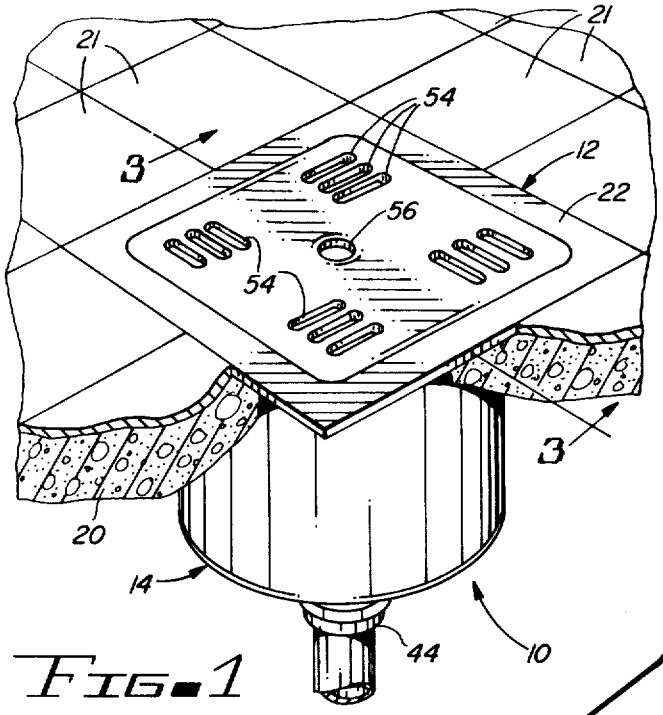
FIG. 1 is a perspective view of the large capacity drainage receptacle of the present invention which is shown as being installed in a typical surface that is to be drained, with the surface being partially broken away to illustrate the various features of the drainage receptacle.

As a study of the accompanying drawings and the following specification will show, this invention provides a large capacity drainage receptacle of the general type often referred to as a floor sink or roof drain. As is well known, floor sinks and roof drains are large capacity devices mounted flush with the surface to be drained to receive liquids and funnel them into relatively smaller disposal lines, and in situations which warrent it, catch foreign solid materials which would otherwise pass into and probably clog the disposal line.

The drainage receptacle of the present invention, which is indicated generally by the reference numeral 10, includes a mounting flange 12 and a receptacle body 14, both of which are of special configuration, as will hereinafter be described in detail, to provide improved performance characteristics and significant cost savings. The particular configuration of the mounting flange 12 provides means for demountably restingly supporting a strainer basket 16 and to inhibit splashing when the drainage receptacle 10 is used to dispose of liquids directed thereinto from drain pipes and hoses (not shown) lying on the surface in which the receptacle is mounted. The mounting flange 12 of the drainage receptacle 10 is also especially configured to demountably support a perforated cover plate 18 in a flush position within the top surface of the flange to provide means for supporting traffic passing over the drainage receptacle. Although reference has been previously made to pedestrian traffic, no intention to limit the invention is intended, rather the cover plate is intended to support any type of traffic which could be impeded by an open receptacle mounted in a trafficked surface.

As hereinbefore mentioned, and as seen best in FIG. 1, the drainage receptacle 10 is intended for flush mounting in a surface 20 which is to be drained. In some installations, the drainage receptacle 10 is mounted in a flat roof, but in most cases it is mounted in the floor of a room where large quantities of water are used, such as an area where food is prepared. Most floor surfaces are provided with some sort of covering material such as the illustrated tiles 21, which may be of ceramic, asphalt composition or similar materials. In any case, such tiles 21 are square and the mounting flange 12 is square to facilitate adjacent installation of the tiles and to allow the drainage receptacle to be mounted in corners of the room or adjacent walls or other vertical surfaces thereof.

Figure 2:
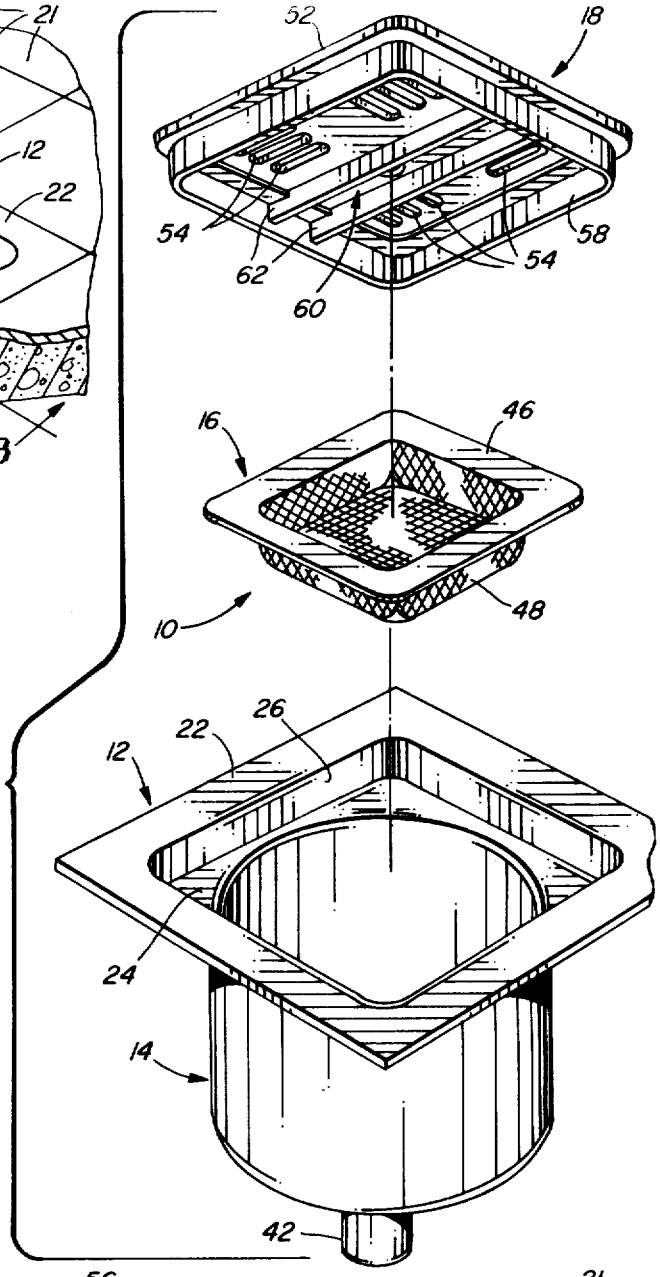
FIG. 2 is a perspective exploded view illustrating the various components which form the preferred embodiment of the drainage receptacle of the present invention.
Figure 3:
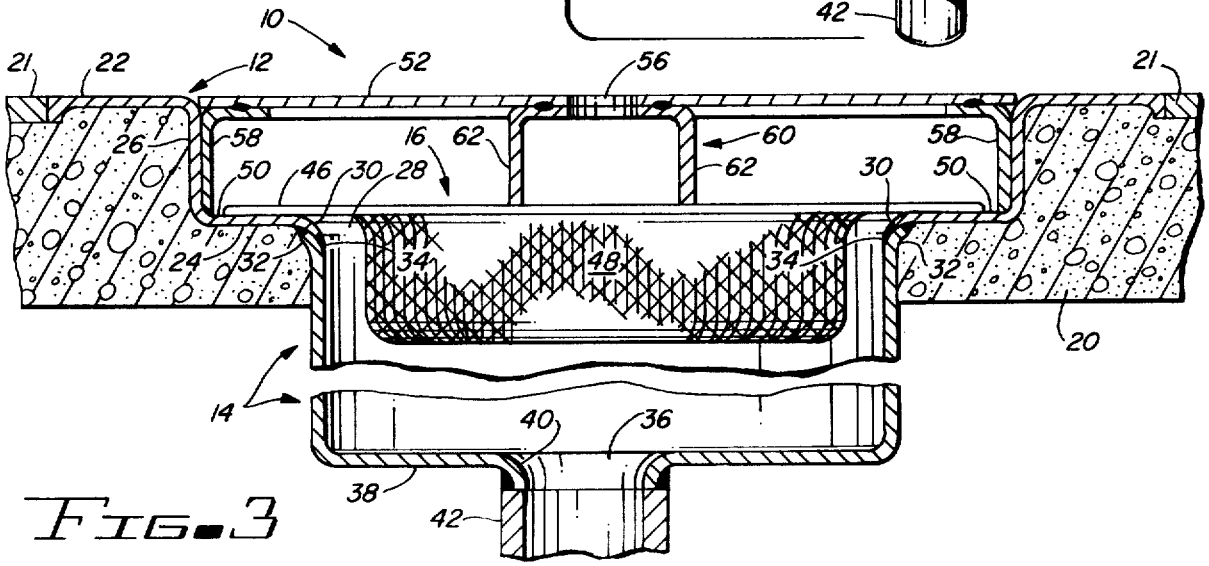
FIG. 3 is an enlarged fragmentary sectional view taken along the line 3—3 of FIG. 1.

As seen best in FIGS. 2 and 3, the mounting flange 12 of the drainage receptacle 10 includes an endless upper flange 22 of square planar configuration which defines a substantially square central opening, and a lower endless recessed flange 24 that is integral with the upper flange 22 by means of an endless vertical sidewall or web 26. Experience with the invention has shown that the recessed relationship of the lower flange 24 serves an anti-splash function when a surface laid drain pipe or hose (not shown) is used to direct liquid into the drainage receptable 10 in the absence of the perforated cover plate 18 or in conjunction with a cover plate especially designed for such use (not shown) by having a portion thereof cut way. The recessed mounting flange 24 defines a circular central opening 28 with a rolled edge 30 circumscribing the opening.

The receptacle body 14 is an open top structure of circular cross section having its upper edge 32 rolled oppositely from the rolled edge 30 of the recessed mounting flange 24 to provide an overlapped fit as shown in FIG. 3. The receptacle body 14 is fixedly mounted to the bottom surface of the recessed flange 24 by welding so as to depend axially from the circular opening 28 of the recessed flange. It will be noted that in the overlapped fit of the rolled edges 30 and 32, it is important that the seam on the inside of the drainage receptacle be filled with weld as shown at 34 and smoothly finished to prevent an open seam in which bacteria could collect and breed. The receptacle body 14 is of circular cross section as hereinbefore mentioned and may be of cylindrical configuration, or of inverted truncated conical configuraton, and is formed with a bottom having a drainage outlet opening 36 formed centrally in its otherwise closed bottom wall 38. The drainage outlet opening is defined by a centrally depressed section 40 of the bottom wall 38 which is fixedly welded in the upper end of a suitable coupling means in the illustrated form of a stub pipe 42 which, as described above, is smoothly finished to eliminate any open seams. The stub pipe 42 is provided as means for attaching a suitable disposal line to the drainage receptacle as shown at 44 in FIG. 1.

Both the mounting flange 12 and the receptacle body 14 are preferrably formed of thin-wall stainless steel due to the inherent resistance of such material to rust and corrosion, and to provide a relatively light weight structure as compared to the cast iron prior art devices. In addition to these advantages, the use of the thin-wall stainless steel in conjunction with the specific configurations of the mounting flange and the receptacle body, those components may be fabricated by a simple stamping operation, or functional equivalent thereof so that expensive assembly labor is minimized and will only involve the above mentioned welding and finishing operations.

The recessed configuration of the mounting flange 12 provides, in addition to its anti-splash function, means for demountably supporting the strainer basket 16 and the perforated cover plate 18 without the need for any fastening hardware.

The strainer basket 16 includes a rigid planar frame member 46 which defines a central opening and dependingly supports a wire mesh basket member 48. Both the frame 46 and the basket 48 are preferrably formed of stainless steel to inhibit rust and corrosion. The frame member 46 is designed to rest on the upper surface of the recessed flange 24 so that the basket member 48 extends through the central opening 28 thereof into the interior of the receptacle body 14 with the bottom of the basket being spaced considerably above the bottom of the receptacle body. It will be noted that, as shown in FIG. 3, the rigid frame member 46 is sized so that when the strainer basket 16 is resting on the recessed flange 24, a clearance exists between the peripheral edge of the frame 46 and the endless sidewall 26 to provide a gap 50 therebetween which circumscribes the rigid frame 46. This gap 50 facilitates removal of the strainer basket 16 when emptying and cleaning thereof are required, and permits the perforated cover plate 18 to be supported on the recessed flange 24 as will hereinafter be described.

The perforated cover plate 18 includes a plate member 52 which is sized to fit snugly in the substantially square inlet opening defined by the upper flange 22 of the mounting flange 12 and to be flush with the upwardly facing surface of the upper flange. The plate member 52 is suitably perforated as shown at 54 to admit the liquid to be drained from the surface 20 and to allow all but the largest solid foreign materials to enter into the drainage receptacle 10. In addition to the drainage openings 54, the plate member 52 is provided with a central hole 56 which facilitates removal of the cover plate 18. An endless wall 58 is dependingly affixed to the lower surface of the plate member 52, such as by welding, and is adjacent the peripheral edge of the plate member. As shown in FIG. 3, the endless wall 58 serves as a cover plate stabilizing means in that when the cover plate 18 is mounted in the drainage receptacle 10, the lower edge of the endless wall is in the gap 50 which circumscribes the strainer basket 16 and bears supportingly on the recessed flange 24. This provides the cover plate 18 with horizontal stability, i.e. resistance to tipping. The endless wall also provides the cover plate with lateral stability, i.e. resistance to sliding, by virtue of its being in bearing engagement with, or at least closely proximate the inwardly facing surface of the vertical web 26 which extends between the upper and recessed flanges 22 and 24 of the mounting flange 12.

As was the case with the other elements of the drainage receptacle 10, the perforated cover plate 18 is preferrably fabricated of relatively thin-wall stainless steel for the reasons hereinbefore fully discussed. Since the plate member 52 of the cover plate is a relatively thin structure, it is provided with a rigidifying means 60 which enables the cover plate 18 to support considerable weight without deformation. The rigidifying means 60 is preferrably in the form of the illustrated U-shaped channel member which is welded to the bottom surface of the plate member 52 in an inverted attitude so that the spaced apart legs 62 of the channel member depend from the plate member 52 and extend centrally across the bottom of the plate. As seen best in FIG. 3, the legs 62 of the rigidifying channel member 60 are sized so that they supportingly bear on the upper surface of the rigid frame 46 of the strainer basket 16. This, in addition to the inherent rigidification provided by the channel member 60, enables the cover plate 18 to support considerably more weight than can be reasonably expected to be placed thereon.

While the principles of the invention have now been made clear in illustrated embodiments, there will be immediately obvious to those skilled in the art, many modifications of structure, arrangements, proportions, the elements, material and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. A large capacity drainage receptacle for mounting in a surface to be drained comprising:

(a) a mounting flange for mounting flush in the surface to be drained and being formed of thin-wall metal, said mounting flange having an upper flange defining a central opening, an endless substantially vertical web integrally depending from the inner edge of said upper flange and a recessed flange extending integrally inwardly from the bottom edge of said web and defining a circular opening; and (b) a receptacle body formed of thin-wall metal and fixedly attached to the downwardly facing surface of said recessed flange so as to be coaxial with the circular opening formed therein, said receptacle body being of circular cross section and having a closed bottom with a drainage outlet opening formed centrally therethrough.

2. A large capacity drainage receptacle as claimed in claim 1 wherein said upper flange of said mounting flange is of square configuration.

3. A large capacity drainage receptacle as claimed in claim 1 wherein said mounting flange and said receptacle body are formed of thin-wall stainless steel.

4. A large capacity drainage receptacle as claimed in claim 1 and further comprising coupling means fixedly mounted in the drainage outlet opening of said receptacle body for connection to a disposal line.

5. A large capacity drainage receptacle as claimed in claim 1 and further comprising a strainer basket demountably supported on said recessed flange to span the circular opening defined thereby.

6. A large capacity drainage receptacle as claimed in claim 5 wherein said strainer basket comprises:

(a) a rigid frame of planar configuration and defining a central opening; and (b) porous means mounted in the central opening of said rigid frame for catching and retaining solid waste materials while permitting liquid flow into said receptacle body.

7. A large capacity drainage receptacle as claimed in claim 1 and further compising a perforated cover plate demountably positioned in the central opening defined by said upper flange of said mounting flange so as to be flush with said upper flange.

8. A large capacity drainage receptacle as claimed in claim 7 wherein said cover plate includes means for horizontal and lateral stabilization thereof.

9. A large capacity drainage receptacle as claimed in claim 7 wherein said cover plate includes means for rigidification thereof.

10. A large capacity drainage receptacle as claimed in claim 7 wherein said cover plate comprises:

(a) a planar plate member formed of thin-wall metal and perforated to permit passage of liquid and solid foreign material therethrough, said planar plate member sized to fit snugly within the central opening defined by the upper flange of said mounting flange;

(b) an endless sidewall fixedly attached to the downwardly facing surface of said plate member and depending therefrom into bearing supportive engagement with said recessed flange of said mounting flange, said endless sidewall dependingly mounted adjacent the peripheral edge of said plate member so as to be in at least close proximity to said web of said mounting flange; and (c) channel means fixedly mounted so as to extend centrally across the downwardly facing surface of said plate member for rigidification thereof.

*11. A large capacity drainage receptacle for mounting in a surface to be drained comprising:*

*a. a mounting flange for mounting flush in the surface to be drained and being formed of thin-wall metal, said mounting flange having an upper flange defining a central opening, an endless substantially vertical web integrally depending from the inner edge of said upper flange and a recessed flange extending integrally inwardly from the bottom dge of said web and defining a central opening; and*

*b. a receptacle body formed of thin-wall metal depending from the downwardly facing surface of said recessed flange so as to be coaxial with the central opening defined thereby, said receptacle body having a closed bottom with a drainage outlet opening formed centrally therein.*

*12. A large capacity drainage receptacle as claimed in claim 11 and further comprising a strainer basket demountably supported on said recessed flange so as to span the central opening defined thereby and configured to dependingly extend into said receptacle body.*

*13. A large capacity drainage receptacle as claimed in claim 11 and further comprising:*

*a. a perforated planar plate formed of thin-wall metal and sized to demountably fit flush within the central opening defined by the upper flange of said mounting flange; and*

*b. an endless sidewall fixedly attached to the downwardly facing surface of said plate and depending therefrom into bearing supportive engagement with the recessed flange of said mounting flange.*

*14. A large capacity drainage receptacle as claimed in claim 13 wherein said endless sidewall is dependingly mounted adjacent the peripheral edge of said planar plate so as to be in at least close proximity to said web of said mounting flange.*

*15. A large capacity drainage receptacle as claimed in claim 13 and further comprising channel means fixedly mounted on the downwardly facing surface of said planar plate for rigidification thereof.*

*16. A large capacity drainage receptacle as claimed in claim 11 and further comprising:*

*a. said upper flange of said mounting flange is of square configuration with the central opening defined thereby being of square configuration;*

*b. said central opening defined by said recessed flange is of circular configuration; and*

*c. said receptacle body is of circular cross section.*

*17. A large capacity drainage receptacle for mounting in a surface to be drained comprising:*

*a. a mounting flange of thin-wall metal for flush mounting in the surface to be drained and including an upper flange defining a central opening, an endless web depending from the inner edge of said upper*

*flange and a recessed flange extending inwardly from the bottom edge of said web and defining a central opening;*

*b. a receptacle body of thin-wall metal depending from said recessed flange of said mounting flange so as to be coaxial with the cenral opening defined thereby, said receptacle body having a close bottom with a drainage opening formed centrally therein; and*

*c. a perforated cover plate of thin-wall metal demountably positioned in the central opening defined by said upper flange of said mounting flange so as to be substantially flush therewith, said cover plate including an endless sidewall for supportive stabilization thereof which includes an endless sidewall depending from said cover plate into bearing engagement with said recessed flange of said mounting flange and being disposed so as to be at least in close proximity with said web of said mounting flange.*

*18. A large capacity drainage receptacle as claimed in claim 17 wherein said perforated cover plate further includes cover rigidifying channel means fixed on the lower surface thereof.*

*19. A large capacity drainage receptacle as claimed in claim 17 and further comprising a strainer basket demountably supported on said recessed flange of said mounting flange so as to span the central opening defined thereby and configured to dependingly extend into said receptacle body.*

* * * * *